United States Patent [19]

Moradmand et al.

[11] Patent Number: 5,425,398
[45] Date of Patent: Jun. 20, 1995

[54] VALVE FOR AUTOMOTIVE DAMPER

[75] Inventors: Jamshid K. Moradmand; Edward C. Ekert, both of Dayton, Ohio; Mark F. Lamps, Grand Rapids, Mich.

[73] Assignee: General Motors Corporation, Detroit, Mich.

[21] Appl. No.: 220,309

[22] Filed: Mar. 28, 1994

[51] Int. Cl.⁶ ............................................. F16K 15/14
[52] U.S. Cl. ..................... 137/854; 137/856; 188/322.15
[58] Field of Search ..................... 137/854, 856; 188/322.15

[56] References Cited

U.S. PATENT DOCUMENTS

| | | | |
|---|---|---|---|
| 3,592,302 | 7/1971 | Allinquant | 137/854 X |
| 3,621,951 | 11/1971 | Schmid | 188/322 |
| 3,827,539 | 8/1974 | Fader et al. | 188/322 |
| 3,957,140 | 5/1976 | Overkott | 188/317 |
| 4,724,937 | 2/1988 | Fannin et al. | 188/319 |
| 5,018,608 | 5/1991 | Imaizuini | 188/322.15 |
| 5,180,186 | 1/1993 | Charles et al. | 280/714 |
| 5,345,970 | 9/1994 | Leyderman | 137/856 |

FOREIGN PATENT DOCUMENTS 472033 of 1952 Italy .
121368 7/1983 Japan ........................... 137/854

Primary Examiner—Robert G. Nilson
Attorney, Agent, or Firm—Anthony Luke Simon

[57] ABSTRACT

A valve for a hydraulic damper comprising a flat circular disc(s) with a central axial opening wherein the disc(s) has a spring characteristic tending to maintain the disc in a flat shape and tending to return the disc(s) to the flat shape when forces deflect the disc(s) from the flat shape, and a disc retainer having a predetermined axial length, a circular cylindrical shape, a central axial opening, axially coextensive with said axial length, a perimeter wall around an outer perimeter of the retainer, an axial wall around a perimeter of the axial opening wherein the perimeter wall has a first diameter, an annular portion inside of the perimeter wall characterized by a shape having a continuously varying curvature arcuately rotated completely around the retainer axis, wherein during a high velocity event, the disc(s) deflects against the retainer and a load between the disc(s) and the disc retainer is spread along the disc(s) surface wherein excessive localized straining of the disc(s) is prevented and wherein maximum magnitude loads are transferred to the retainer.

9 Claims, 6 Drawing Sheets

VALVE FOR AUTOMOTIVE DAMPER

This invention relates to a valve for an automotive hydraulic damper.

BACKGROUND OF THE INVENTION

Automotive shock absorbers and struts are hydromechanical devices employed in vehicle suspension systems designed to isolate the vehicle body from various road inputs and induced vibrations. The shock absorbers and struts provide a damping force against relative motion between the unsprung vehicle wheels and the sprung vehicle body. The damping device generally comprises a rod with a piston slidably engaging a tube assembly. As the rod and piston travel relative to the tube assembly fluid flows through internal valves in a controlled manner. In general, the damping force is a function of the relative velocity between the rod and tube assemblies and the flow restrictions through internal valves.

One known type of valve assembly uses one or more deflective discs made of high strength spring steel seated on an orifice plate to control and restrict flow. The orifice plate has small orifices through which fluid flows during low relative velocity damping events when the discs remain seated against the orifice plate. During mid-range velocity damping events, damping force is determined by the force deflection characteristic of the discs and the resulting flow area. At high velocity, a fixed flow area determines damping force. In some valves the maximum deflection of the discs determines the fixed flow area.

There is often a trade-off between driver comfort during mid-range damping events and disc durability during high velocity events. More particularly, for the disc in the valve to maintain structural integrity during high velocity damping events, the disc deflection must be limited to avoid the possibility of yield of the spring steel or the disc strength must be increased. However, increasing the strength of the disc in the valve often results in increased thickness of the disc and/or its resistance to deflection thereby increasing ride harshness during mid-range events where driver comfort is desired.

SUMMARY OF THE PRESENT INVENTION

Advantageously, this invention provides a deflected disc valve for an automotive shock absorber and/or strut that provides both increased robustness and structural integrity during high velocity events while also allowing improved control of damping during medium velocity events.

Advantageously, this invention provides a valve for hydraulic shock absorber or strut that allows large valve openings while preventing excessive localized straining of the disc(s).

Advantageously, this invention eliminates the necessity of a stack of successively smaller discs in a valve to maintain valve integrity. Advantageously, this invention removes the mechanical burden of high hydraulic loads from a disc or discs in a disk valve assembly subject to high hydraulic loads while increasing available flow area and eliminating mechanical failure of the disc(s) due to hydraulic pressure.

Structurally, this invention comprises a valve for a hydraulic damper comprising one or more flat circular disc(s) with a central axial opening wherein the disc(s) has a spring characteristic tending to maintain the disc(s) in a flat shape and tending to return the disc(s) to the flat shape when forces deflect the disc(s) from the flat shape; and a disc retainer having a predetermined axial length, a circular cylindrical shape, a central axial opening, axially coextensive with said axial length, a perimeter wall around an outer perimeter of the retainer, an axial wall around a perimeter of the axial opening wherein the perimeter wall has a first diameter, an annular portion inside of the perimeter wall characterized by a shape having a continuously varying curvature arcuately rotated completely around the retainer axis, wherein during a high velocity event, the disc(s) deflects against the retainer and a load between the disc(s) and the disc retainer is spread along the disc(s) surface wherein localized straining of the disc(s) is eliminated and wherein maximum magnitude loads are transferred to the retainer.

A more detailed description of this invention, along with various embodiments thereof, is set forth below.

DETAILED DESCRIPTION OF THE INVENTION

Figure 1:
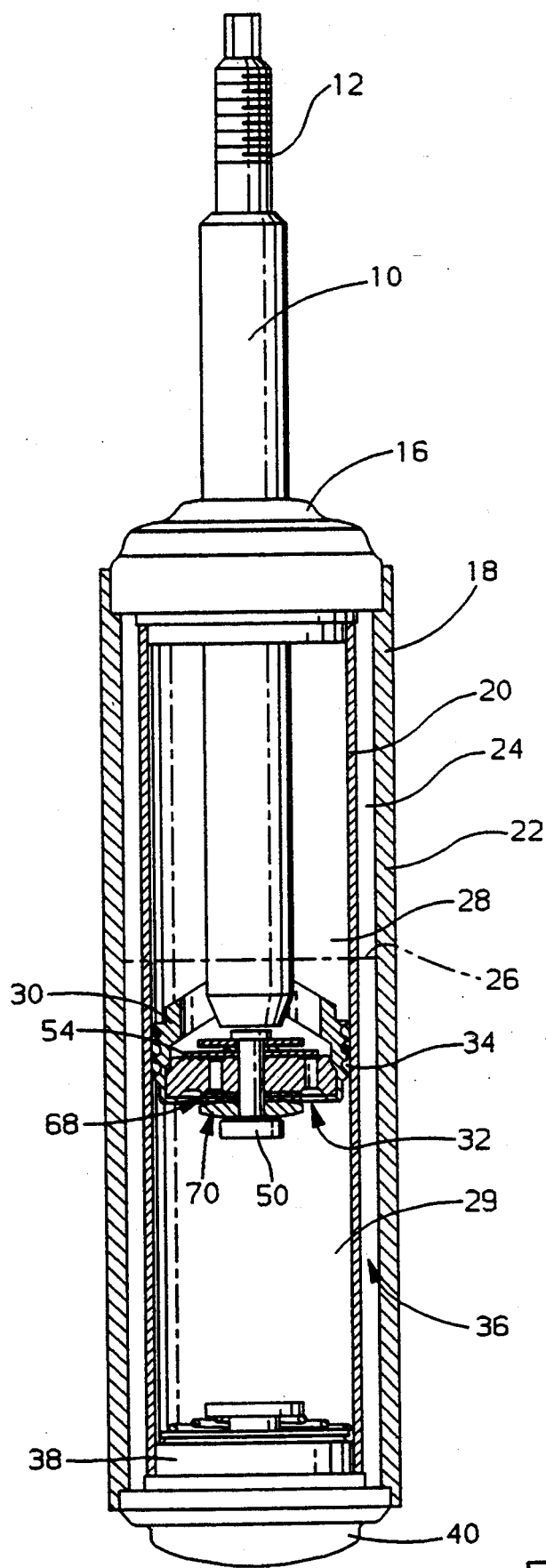
FIG. 1 illustrates a hydraulic damper for use with this invention.

Referring to FIG. 1, a hydraulic damper is shown including the valve assembly 32 according to this invention. The damper includes a rod 10 and a cylinder body 18. The rod 10 slidably engages cylinder body 18 through a rod guide (not shown) that suitably seals around rod 10 within the sealed cylinder upper end 16. Rod 10 is attached to a piston main body 30 within the cylinder body 18. Piston main body 30 slidably engages against cylinder tube 20 and includes a seal 34 for sealing against cylinder tube 20. Piston main body 30 includes flow passages of a known type and a valve assembly 32 described in more detail below.

During operation of the damper shown, one end (such as threaded end 12) is attached to a vehicle sprung body and a second end 40 is attached to a vehicle wheel assembly. Both attachments can be made through any known manner of attaching hydraulic dampers. During vehicle travel, relative movement between the unsprung vehicle wheel and the sprung vehicle body causes relative movement between the rod 10 and cylinder body 18. During this relative movement, piston main body 30 slides against inner cylinder tube 20, causes the upper and lower chambers 28 and 29 to change size in an inverse relation. A hydraulic fluid that fills the upper and lower chambers is forced to flow through the piston main body 30 including the valve assembly 32 due to the relative movement between the rod 10 and cylinder body 18 and the changing sizes of upper and lower chambers 28 and 29. Control of the flow of fluid through the piston main body 30 provides the damping characteristics of the damper.

The cylinder body 18 also includes a reservoir tube 22, which defines an annular cylindrical chamber exterior to cylinder tube 20 that serves as a reservoir for hydraulic fluid. Hydraulic fluid 26 is in the lower portion of the annular cylindrical chamber formed by reservoir tube 22 and air 24 is in the upper portion. During relative velocity events imposed between rod 10 and cylinder body 18, fluid travels through compression valve 38 into and out of the reservoir between the cylinder tube 20 and reservoir tube 22 in a known manner.

Figure 2:
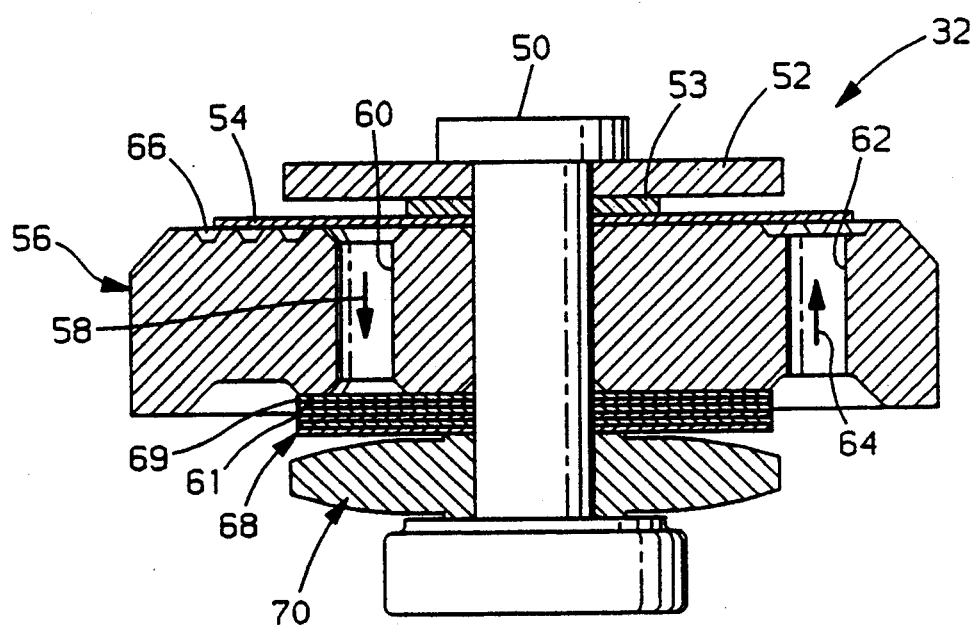
FIG. 2 illustrates a disc valve according to this invention.

Referring now to FIG. 2, a view of the valve assembly according to this invention is shown. The valve assembly includes an orifice plate 56, including flow passages 60, 62 and 66. A first deflecting disc valve is formed with disc 54 held in place by clamp disc 53 and flat retainer 52. A second disc valve is formed by disc stack 68, for example, comprising a stack of five spring steel deflectable discs all of the same outer diameter. The disc stack 68 is retained in place by retainer 70 and the entire assembly is held together by an axial rivet 50.

Referring now again also to FIG. 1, when the rod 10 and cylinder body 18 are forced to move in a first direction at a low relative velocity causing the upper chamber 28 to enlarge and lower chamber 29 to become smaller, flow through the valve assembly may be through small slots provided in the upper disc 69 of the disc stack 68 through passage 60 and through passages (not shown) to passages 66 and into upper chamber 28. During a faster relative movement, the increased speed of fluid flow causes fluid flow through passage 62 in the direction of arrow 64 forcing disc 54 to deflect allowing the fluid to transfer at a faster rate between the lower chamber 29 and upper chamber 28.

When the rod 10 and cylinder body 18 are forced to move in the opposite relative directions, causing the upper chamber 28 to become smaller and the lower chamber 29 to become larger, fluid flow moves through passages 66 and communicate though passages (not shown) to passage 60 in the direction of arrow 58. If the relative velocity is slow, slots (not shown) in the top disc 69 in the disc stack allow the fluid to pass into the lower chamber 29. If the relative velocity is faster, fluid flow through passage 60 causes deflection of disc stack 68 allowing the fluid to pass into the lower chamber 29 at a faster rate. Many types of structures for orifice plate 56 are well known and easily implemented by those skilled in the art.

Figure 3:
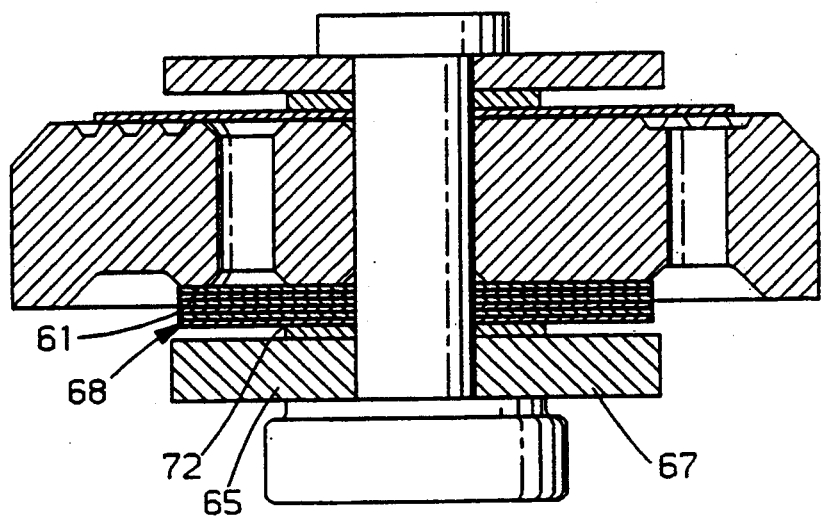
FIG. 3 illustrates a prior art disc valve.

Referring now also to FIG. 3, an example prior an assembly is shown that includes a flat retainer 67 and clamp disc 65 (which acts as a spacer) instead of retainer 70. A limitation of the design shown in FIG. 3 is the limited disc displacement of the disc pack 68 in order to guarantee structural integrity. That is, if disc displacement is not properly limited, excess displacement may cause yielding of the disc. When disc yielding occurs, the disc will no longer return to its original flat shape, which may have some performance affects on the damper. Repeated disc yielding may lead to subsequent failure (i.e., fracture of the disc). The maximum flow area provided by a disc valve is defined by the maximum displacement of the discs 68 away from the valve seat 61. It has been shown that the disc valve, including disc pack 68 comprising a singular disc having a diameter of 16 mm and 0.15 mm thick, obtained a maximum disc deflection of 0.13 mm at a uniform disc pressure of 10 MPa, while maintaining the disc stress below a predetermined limit. To prevent the localized stress from increasing above the predetermined limit, the disc must be mechanically limited to a deflection of 0.13 mm, which deflection distance the disc actually achieved by a uniform disc pressure of 3 MPa.

Figure 4:
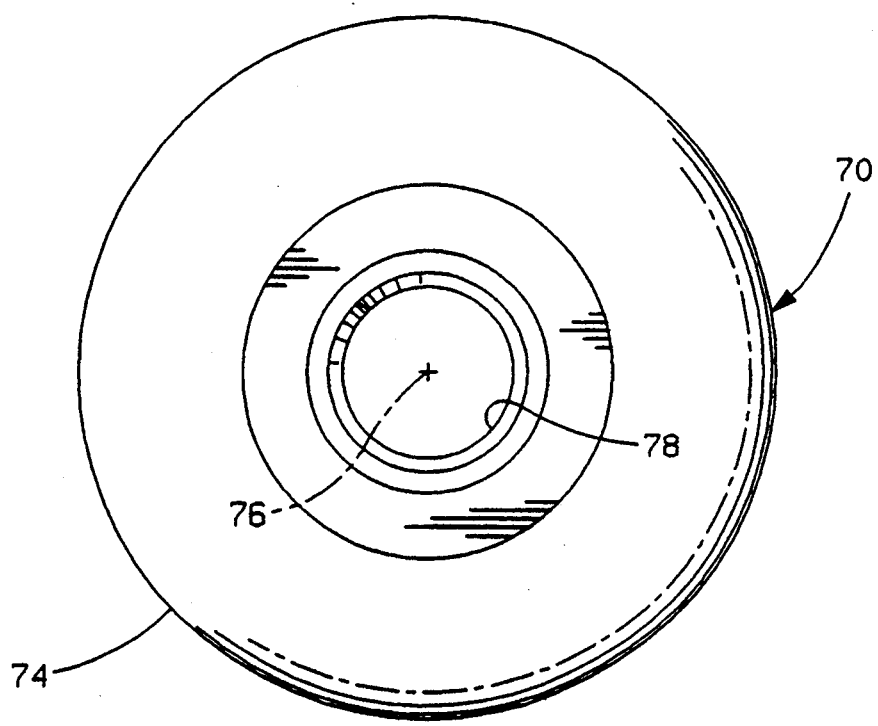
FIGS. 4 and 5 illustrate a disc retainer according to this invention.
Figure 5:
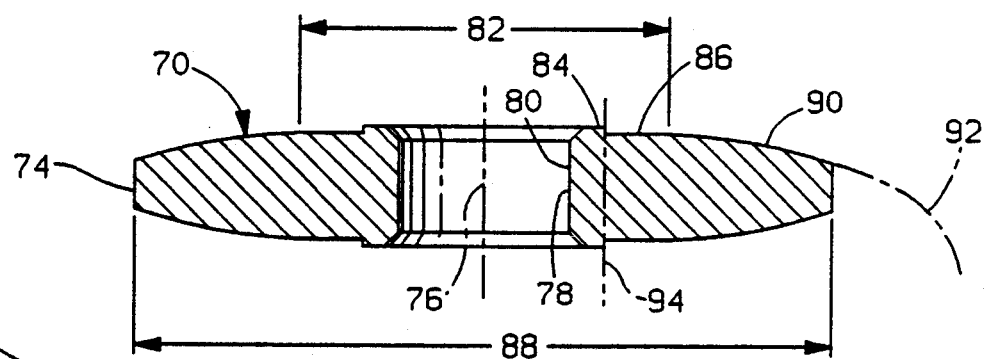

Referring now also to FIGS. 4 and 5, additional views of the retainer 70 according to this invention are shown. The retainer 70 shown is a generally circular cylinder shape having an axial length in the range of 2.5 mm. The retainer 70 may be constructed of any suitable metal, such as steel, may be made from powdered metal, or may be a suitable type of plastic. The retainer 70 has an outer cylindrical surface 74 circular about axis 76 and an axial bore 78 with an inner wall 80 defining a ring type structure for the retainer. The retainer 70 has a slightly raised annular portion 84 defining the inner portion of the ring formed by the retainer and which forms a clamp seat for the disc pack 68. The flat ring portion 86 is radially exterior of the raised portion 84 and has an outer diameter 82. Between the outer diameter 82 of the flat ring portion 86 and the outer diameter 88 of the retainer 70, the retainer surface 90 is continuously curved in a shape having a continuously varying curvature. In one example, the shape having a continuously varying curvature is a parabola halved along its axis. An imaginary halved parabola is shown as reference 92 and the annular curved surface 90 is defined by a rotation of the halved parabola 92 about axis 76 of the retainer 70. The axis of the parabola 92 is shown as reference 94.

The advantage provided by the retainer, according to this invention, includes the elimination of disc failure in the valve caused by localized straining of the disc. For example, refer again to FIG. 3, clamp disc 65 and reference 72. At maximum deflection of the disc pack 68 shown in FIG. 3, localized straining on the disc pack 68 is caused by the corner of the clamp disc 65 at its perimeter 72. This localized straining, in certain test cases where travel of disc pack 68 was not properly limited, has led to mechanical failure of the disc pack 68. This is why, in the prior art FIG. 3, disc travel is mechanically limited to a distance of 0.13 mm. By replacing the flat retainer 67 and clamp disc 65 with the retainer 70, according to this invention, the disc pack is allowed to deflect along the entire arcuate perimeter and has a continuous surface to rest upon during maximum application of pressure to the discs preventing excessive or disproportionate localized straining of any portions of the disc, such as at portion 72 in FIG. 3. Thus, the loading of the disc pack 68 caused by rapid fluid transfer through the valve and maximum deflection of the disc pack 68 is successfully transferred to the retainer 70 before the straining of the disc pack 68 reaches a point that would cause yield or mechanical failure of the disc pack 68.

Figure 6:
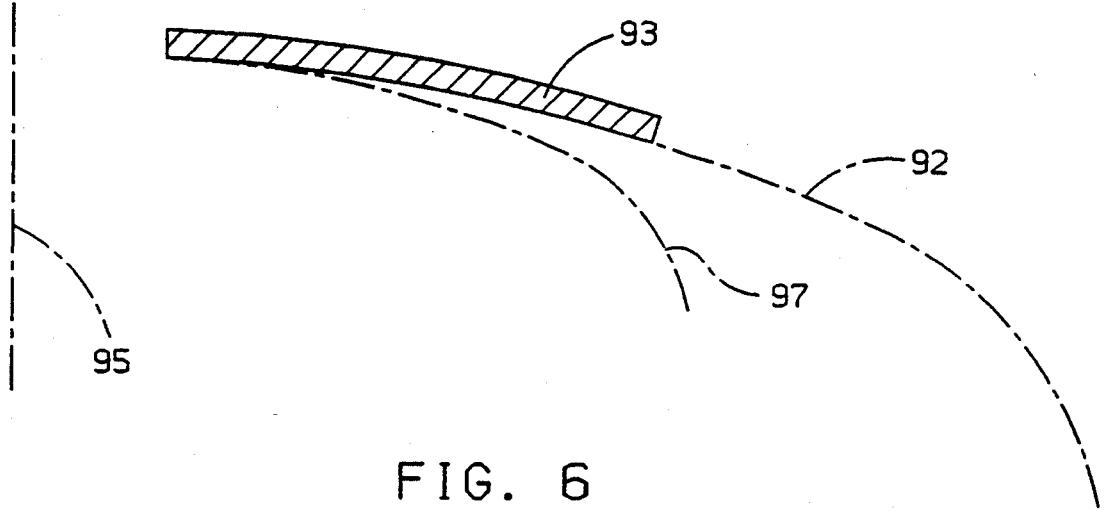
FIG. 6 illustrates disc deflection response.

Referring to FIG. 6, it is found according to this invention that maximum disc deflection that prevents localized straining of any specific area of the disc in a valve occurs in a shape having a continuously varying curvature, such as shown for sample disc 93 by parabola 92 having an axis 95. Using disc(s) that deflect in the shape of a parabola as an example, each such disc 93 has a characteristic limit which is the smallest focal length parabolic shape, for example, parabola 97, to which the disc can conform without mechanical failure. According to this invention, the parabolic shape of the curved surface 90 of the retainer 70 has a focal distance greater than that of the smallest focal length parabola to which each disc can deflect without mechanical failure. What is shown in FIG. 6 is that mechanical failure due to excessive straining on the disc 93 can be completely eliminated by providing the retainer 70, according to this invention, with a parabolic surface 90 with the limitation that the parabolic surface has a focal distance greater than that of the smallest parabola to which the disc can conform and maintain its structural integrity.

This contrasts with the prior art shown in FIG. 3 in which portions of the disc pack 68 are exposed to localized straining and do not having a continuous support. This invention also eliminates the necessity of using a design implementing successively smaller discs.

This invention, as described with reference to FIG. 6 is contrasted to similar valves with disc retainers having other than a shape having a continuously varying curvature. Such other shapes can cause the disc to deflect from its natural deflection characteristic, causing disproportionate internal straining at portions of the disc forced out of their natural deflection, which can lead to mechanical failure under high load conditions or force a limited deflection distance. Since the disc retainer according to this invention follows the natural deflection of the disc under pressure that results in maximum deflection with minimized disc stress, all excessive portions of maximum valve loads are transferred to the retainer, eliminating the possibility of mechanical failure due to disc deflection.

Figure 7:
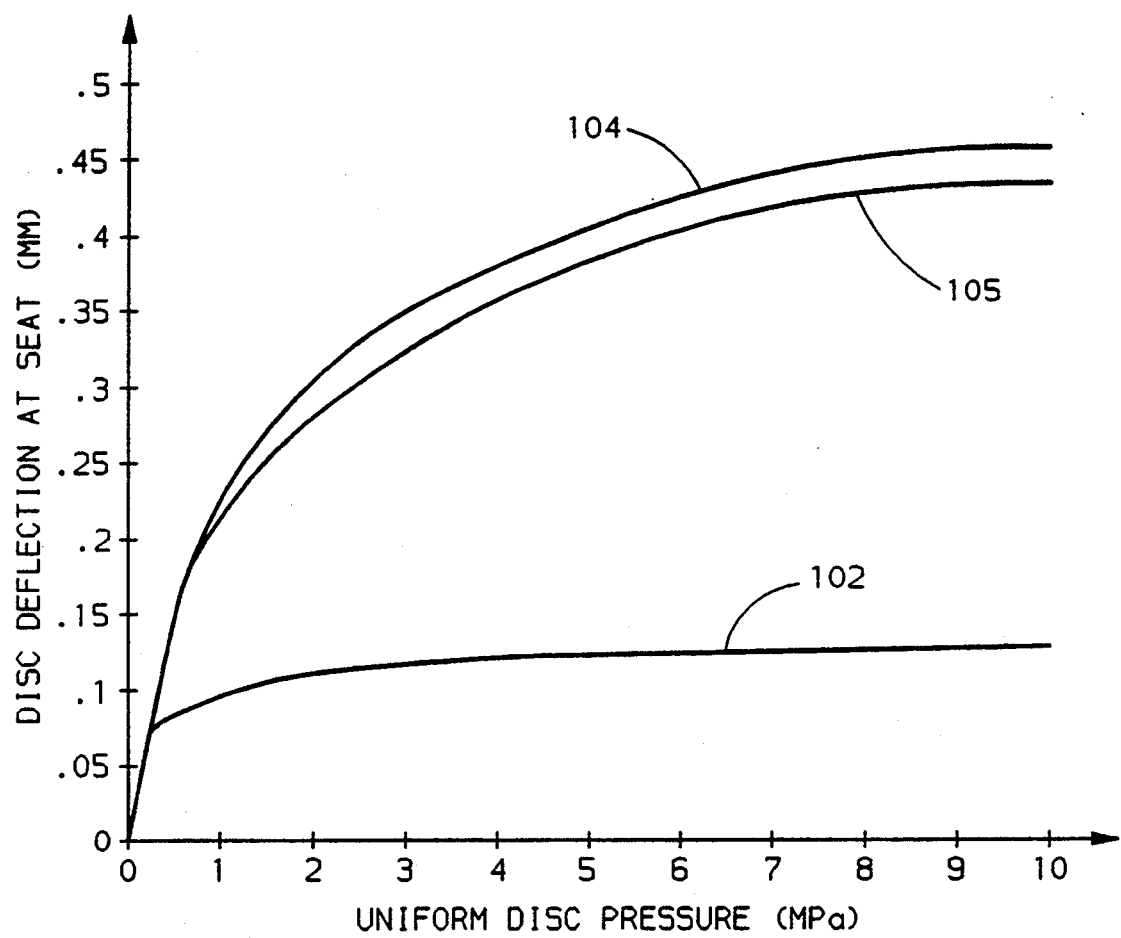
FIG. 7 graphs the analytic comparison of example prior art versus the present invention.

Referring now to FIG. 7, the graph shown compares disc deflection (as determined by finite element analysis) from the valve seat 61 (FIGS. 2 and 3) to uniform disc pressure. Trace 104 represents the valve design according to this invention shown in FIG. 2 and trace 102 represents the prior art valve design shown in FIG. 3. In both designs, the maximum disc deflection is limited to keep the maximum stress levels in the disc below the predetermined limit (i.e., the same predetermined limit referred to above with reference to FIG. 3) in order to guarantee the structural integrity of the disc(s). The horizontal axis represents uniform pressure against the disc and the vertical axis represents disc deflection from the valve seat. Trace 102 illustrates that the prior art design of FIG. 3 achieves a limited deflection of disc stack 68 of approximately 0.13 mm and must be mechanically limited to that deflection distance to keep maximum stress levels in the disc below the predetermined limit. However, when the same disc pack is used with the retainer 70 according to this invention, disc deflection from the seat 61 achieved a distance of 0.45 mm at a uniform disc pressure of 10 MPa, a 246% improvement over the valve shown in FIG. 3. This disc deflection of 0.45 mm was obtained while stress levels within the disc were limited to the same predetermined limit under which the prior art deflected only 0.13 mm.

Trace 105 illustrates the deflection of a disc valve using the same disc pack used to obtain traces 102 and 104 and a retainer in which the curved surface arcuately rotated completely around the retainer axis has a constant radius, i.e., is circular, as opposed to having a continuously varying curvature. The maximum deflection achieved by the constant radius curved surface design is approximately 0.425 mm (radius of curvature approximately 10.3 mm) while stress levels within the disc were limited to the same predetermined limit under which the prior art shown in FIG. 3 obtained with a deflection of only 0.13 mm. Trace 104 illustrates that the continuously varying curvature design according to this invention achieved a 4–5% improvement over the design (trace 105) with a continuous radius curvature.

The significance of the increased disc deflection according to this invention is that the greater deflection allows greater fluid flow thus giving damper designers a greater range of flow capabilities. The increased flow capability allows designers to design dampers with softer response to mid-velocity range events while the load transfer to the retainer and the elimination of localized straining of portions of the disc eliminates disc mechanical failure during high velocity damping events. Designers can utilize this invention to change the focal distance of the parabola 92 (FIG. 5) or change the type of curvature (i.e., Nth order polynomial) describing the continuously varying curvature to mechanically limit disc travel with a continuously varying curve that allows lesser disc deflection in those cases where the expanded disc travel is not desired. For example, for the disc pack graphed in FIG. 7, the range of designs is a whole set of curves below trace 104.

A further significance of the greater deflection distance achievable using this invention is that pre-loading is now practical for the disc pack and therefore for the valve. Pre-loading is defined as designing the valve pack 68 and valve seat 61 so that when a valve assembly is assembled, seat 61 causes a slight deflection of the valve pack 68, thus building a predetermined force into the disc pack 68 against seat 61 so that disc pack 68 will not deflect until this force level is overcome. Until this force level is overcome, fluid flow is forced through the low velocity event fluid paths.

Pre-loading of the disc pack 68 for the valve 32, shown on FIG. 2, has been shown in some instances to be desirable because it allows greater flow control of low velocity events of the damper. If the disc pack is not preloaded, a relatively low velocity event could cause deflection of the disc pack 68 thus changing flow from the low velocity path to allow flow passed the disc due to the disc deflection. If the disc valve has a limited disc deflection of 0.13 mm, pre-loading of the disc would use us as much as 0.1 mm. of disc travel, allowing only 0.03 mm. additional deflection during damping events, which would not provide adequate performance of the valve.

Thus, according to this invention, a valve is provided that allows disc(s) deflection along an entire perimeter of a disc valve and that when the disc(s) reaches maximum deflection, the entire circumferential deflected portion rests against a continuous curved surface having a continuously varying shape, such as a Nth order polynomial where N is greater than 1, found to provide a continuous surface against which the disc can transfer its load, thus preventing excessive localized staining of the valve and transferring potentially destructive loads from the disc(s) to the more robust retainer.

Figure 8:
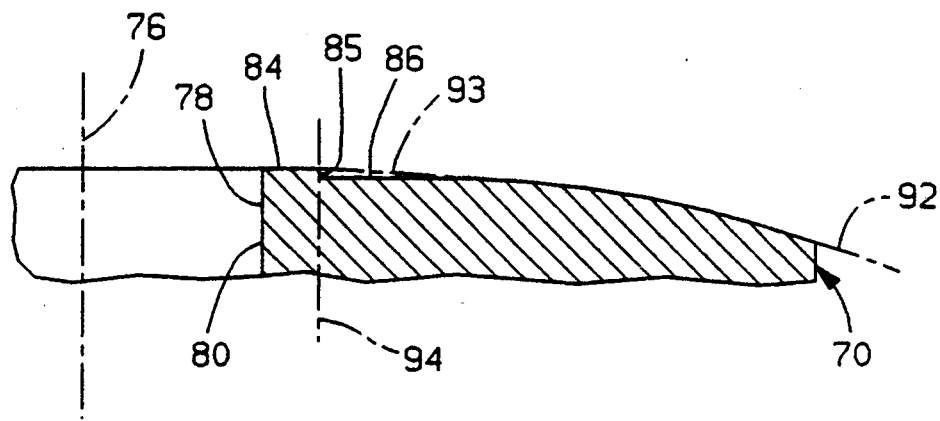
FIG. 8 illustrates a view of a retainer according to this invention adapted for use with a preloaded valve.

Referring now to FIG. 8, the example retainer 70 according to this invention is adapted for valves in which pre-loading of the disc(s) is desired. The retainer 70 includes an undercut flat 86, which undercuts the imaginary extension 93 of parabola 92 to the parabola axis 94. The undercut depth is the length of circumferential riser 85, which may be, for example, 0.06 mm. The inner and outer diameters of flat portion 86 may be, for example, 6 and 9 mm.

Figure 9:
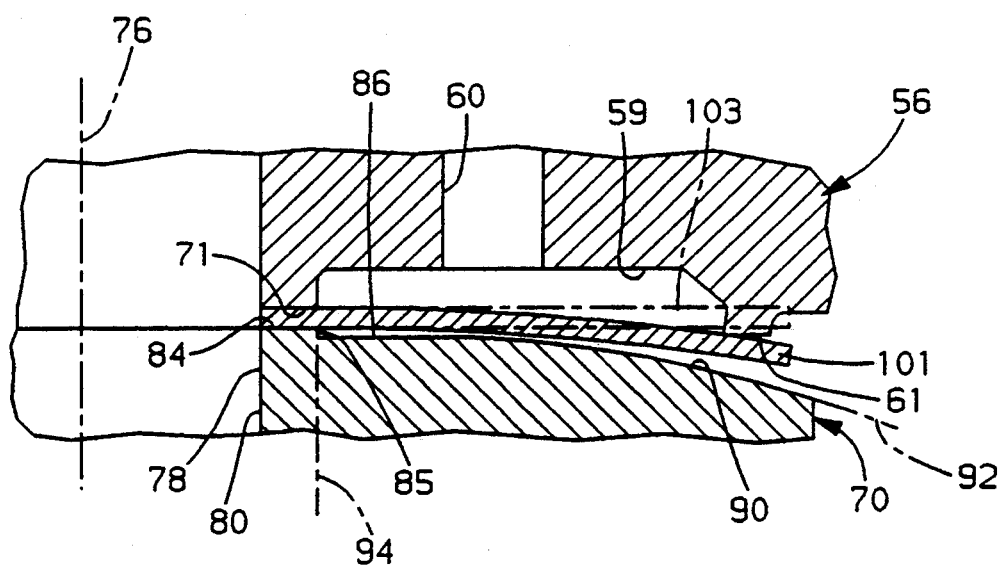
FIG. 9 illustrates valve pre-loading according to this invention.

To understand the pre-loading benefit achieved by the invention as shown in FIG. 8, refer now also to FIG. 9. Retainer 70 is shown together with a preloaded disc 101 and an example orifice plate 56. Orifice plate 56 has a hub 71 that, together with raised surface 84 of retainer 70, clamp the disc 101 in place. On the circumferential exterior of passages 59 and 60, valve seat 61 presses against disc 101 as shown and forces a slight deflection of disc 101. The slight deflection affords the valve a slight pre-load, that is, raises the minimum pressure that will deflect the disc 101 from valve seat 61. The natural, non-deflected position of disc 101 is shown in phantom by reference 103. If the undercut 85, 86 was not provided on the retainer 70 and if the curved surface 90 was extended along reference 93 (FIG. 8), when the disc 101 is preloaded, tolerance variations of retainer 70, hub 71 and seat 61 would vary the outermost contact point along the retainer 70 that the preloaded disc would meet the retainer. That is, the clamp diameter of the free extending portion of disc 101 when the disc is preloaded, but otherwise not loaded, would vary due to tolerance variations. The result is that the pre-load force of the disc would vary widely in proportion to the clamp diameter of the free extending portion of disc 101.

According to this invention as shown in FIGS. 8 and 9, the potential for widely varying pre-load forces on the disc is eliminated because undercut 85, 86 clamps the inner diameter of the free extending portion 103 of disc 101 to the outer diameter of raised flat surface 84, which is the diameter of riser 85. Thus, according to this invention, a preloaded valve may be provided with repeatable pre-load forces. For valves where pre-loading is not desired, undercut 85, 86 may be omitted and curved surface 90, having the continuously varying curvature, may extend to flat surface 84.

According to another aspect of this invention, the retainer 70, as shown in FIG. 5 is symmetrical about a plane orthogonal to retainer axis 76. This symmetrical design allows for a less complicated feeder for use in automated assembly of the damper.

Figure 10:
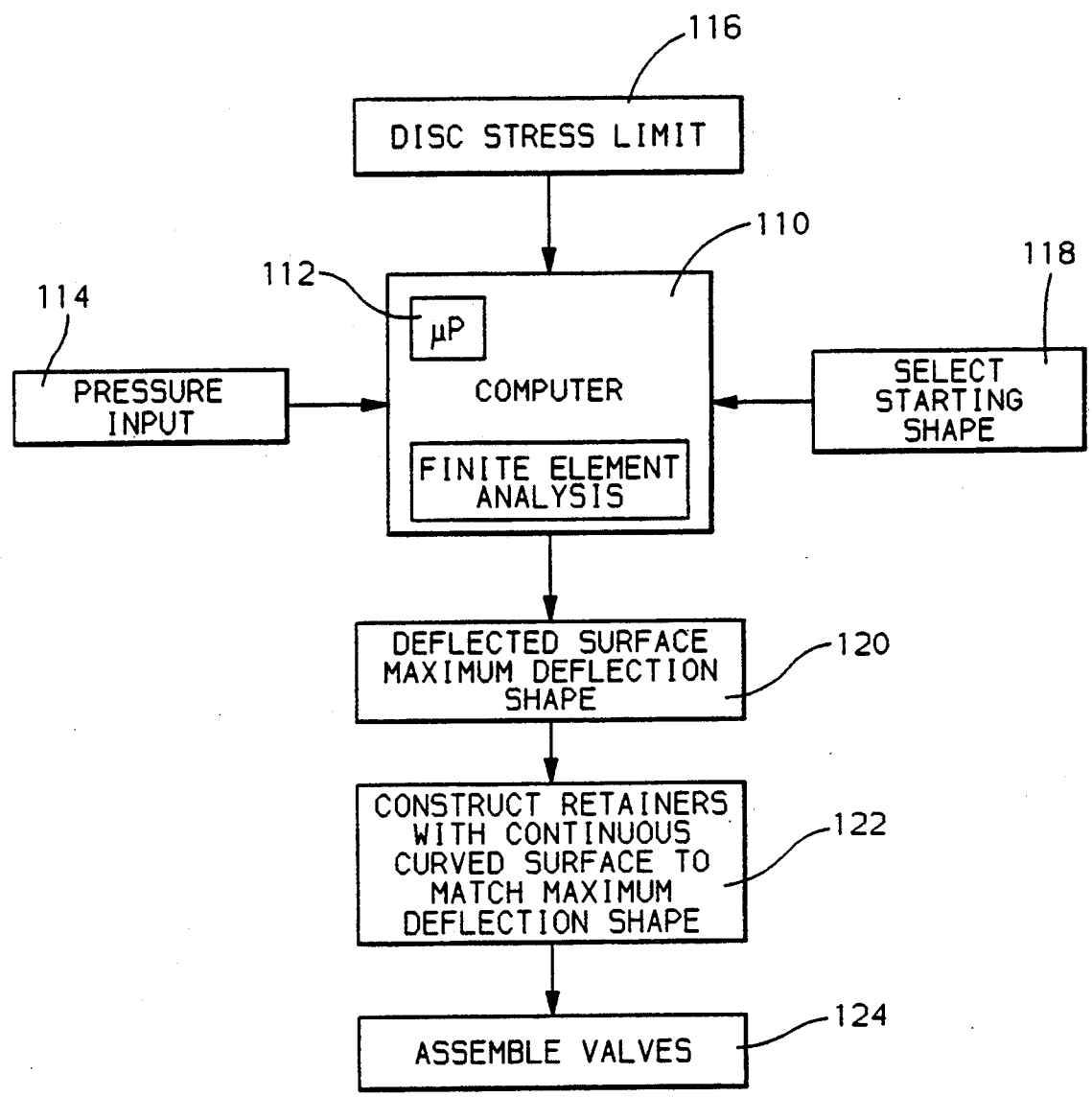
FIG. 10 illustrates the method of manufacture according to this invention.

Referring now to FIG. 10, a method of manufacturing damper valve assemblies according to this invention is shown. The method includes the use of a computer 110 including a microprocessor 112 with a commercially available finite element analysis program. A value for uniform disc pressure is selected i.e., the maximum pressure that a high velocity damping event would provide based on the known damper characteristics. This selected uniform pressure is input to the computer 110 (block 114). Also a maximum disc stress level (block 116) is input into the computer 110. The maximum disc stress level is determined as a level within which the disc will retain structural integrity under high-cycle, high-velocity loading. The disc stress limit may be determined from experimental testing or may be provided by the steel manufacturer. The finite element analysis program generates the output shape 120, which maximizes disc(s) deflection given a maximum pressure input and subject to a stress limit (see, for example, FIG. 6). For some finite element analysis programs, it may be desirable to try various shapes (block 118) to determine the shape that maximizes disc deflection within the stress limit. Input shapes may include 2nd, 3rd, 4th . . . Nth order polynomials, etc..

At block 122, the shape 120 output from the computer 110 is used to design and construct disc retainers such that the shape 120 is incorporated into the disc retainer as a continuously curved retainer surface against which the disc will deflect. Retainer 70 above is an example such retainer. The retainer may be machined from metal, molded to shape from plastic or powdered metal, or may be molded to an approximate shape and then machined, i.e., to provide the undercut.

At block 124, valves according to this invention, such as shown in FIG. 2, are assembled using the retainers constructed at block 122. Those skilled in the art can easily complete the valve construction by aligning the valve disc(s), retainer(s) and orifice plate and suitably fastening the assembly, for example with rivet 50 (FIG. 2) of a known type. Further details of this process need not be set forth herein.

One skilled in the art will appreciate from the foregoing that the method of manufacturing valve assemblies according to this invention is embodied in the steps of: (a) determining a disc region to be subjected to a differential pressure.; (b) setting a predetermined stress limit on the disc; (c) determining a continuously curved deflection shape of the disc responsive to a uniformly applied pressure over the pressure region providing maximum disc deflection from a valve seat; (d) constructing a disc retainer with a continuous curved annular surface to match the deflection shape; and (e) assembling the disc and retainer into a valve assembly, wherein, during high hydraulic pressure events, the disc deflects in conformation with the continuously curved annular surface of the retainer and transfers excessive loads to the retainer, eliminating the possibility of mechanical failure of the, disc due to high pressure loads.

While the invention described above is described with use in a piston valve for a damper, this invention may be used with any valve in the damper including compression valve 38. Further, the damper in which this valve may be used need not be the double cylinder type shown in FIG. 1, but may be a single cylinder type.

The above description of this invention is an example implementation. Moreover, various improvements and modifications to this invention may occur to those skilled in the art and will fall within the scope of this invention as set forth below.

The embodiments of the invention to which an exclusive right or privilege is claimed are defined as follow:

1. A valve for a hydraulic damper comprising:
   a flat circular disc with a central axial opening, wherein the disc has a spring characteristic tending to maintain the disc in a flat shape and tending to return the disc to the flat shape when forces deflect the disc from the flat shape; and
   a disc retainer having a predetermined axial length, a circular cylindrical shape, a central axial opening, axially coextensive with said axial length, a perimeter wall around an outer perimeter of the retainer, an axial wall around a perimeter of the axial opening wherein the perimeter wall has a first diameter, the disc retainer having an end characterized by a second diameter portion that is smaller than the first diameter of the perimeter wall, wherein within the second diameter portion, the retainer is substantially flat, and an annular portion outside of the second diameter portion and inside of the perimeter wall characterized by a shape having a continuously varying curvature arcuately rotated completely around the retainer axis,
   wherein during a high velocity event, the disc deflects against the retainer and a load between the disc and the disc retainer is spread along the disc surface wherein excessive localized straining of the disc is prevented and wherein maximum magnitude loads are transferred to the retainer.

2. A valve for a hydraulic damper comprising:
- a flat circular disc with a central axial opening wherein the disc has a spring characteristic tending to maintain the disc in a flat shape and tending to return the disc to the flat shape when forces deflect the disc from the flat shape; and
- a disc retainer having a predetermined axial length, a circular cylindrical shape, a central axial opening, axially coextensive with said axial length, a perimeter wall around an outer perimeter of the retainer, an axial wall around a perimeter of the axial opening wherein the perimeter wall has a first diameter, an annular portion inside of the perimeter wall characterized by a shape having a continuously varying curvature arcuately rotated completely around the retainer axis,
- wherein during a high velocity event, the disc deflects against the retainer and a load between the disc and the disc retainer is spread along the disc surface wherein excessive localized straining of the disc is prevented and wherein maximum magnitude loads are transferred to the retainer.

3. The valve set forth in claim 2 wherein the retainer is symmetrical about a plane perpendicular to the retainer axis.

4. A valve for a hydraulic damper comprising:
- a flat circular disc with a central axial opening wherein the disc has a spring characteristic tending to maintain the disc in a flat shape and tending to return the disc to the flat shape when forces deflect the disc from the flat shape; and
- a disc retainer having a predetermined axial length, a circular cylindrical shape, a central axial opening, axially coextensive with said axial length, a perimeter wall around an outer perimeter of the retainer, an axial wall around a perimeter of the axial opening wherein the perimeter wall has a first diameter, an curved annular portion inside of the perimeter wall characterized by a shape having a continuously varying curvature arcuately rotated completely around the retainer axis, a flat annular portion between the curved annular portion and the axial wall, and an undercut of the shape having a continuously varying curvature, the undercut being annular in shape and located exterior of the flat annular portion and interior of the curved annular portion,
- wherein during a high velocity event, the disc deflects against the retainer and a load between the disc and the disc retainer is spread along the disc surface wherein excessive localized straining of the disc is prevented and wherein maximum magnitude loads are transferred to the retainer.

5. The valve set forth in claim 4 also comprising an orifice plate including a hub and a seat, wherein the flat circular disc is retained in place by the hub and the flat annular portion and wherein the seat forces a deflection of the disc to pre-load the disc.

6. The valve set forth in claim 5 wherein the undercut minimizes variations in the pre-loading of the disc by limiting a clamp diameter of the disc to an outer diameter of the flat annular portion.

7. The valve set forth in claim 4 wherein the shape having the continuously varying curvature is a parabola halved along its axis.

8. A valve for a hydraulic damper comprising:
- a flat circular disc with a central axial opening wherein the disc has a spring characteristic tending to maintain the disc in a flat shape and tending to return the disc to the flat shape when forces deflect the disc from the flat shape; and
- a disc retainer having a predetermined axial length, a circular cylindrical shape, a central axial opening, axially coextensive with said axial length, a perimeter wall around an outer perimeter of the retainer, an axial wall around a perimeter of the axial opening wherein the perimeter wall has a first diameter, a curved annular portion inside of the perimeter wall characterized by a shape having a curvature arcuately rotated completely around the retainer axis, a flat annular portion between the curved annular portion and the axial wall, and an undercut of the curved annular portion, the undercut being annular in shape and located exterior of the flat annular portion and interior of the curved annular portion,
- wherein during a high velocity event, the disc deflects against the retainer and wherein maximum magnitude loads are transferred to the retainer and also comprising
- an orifice plate including a hub and a seat, wherein the flat circular disc is retained in place by the hub and the flat annular portion and wherein the seat forces a deflection of the disc to pre-load the disc.

9. The valve set forth in claim 8 wherein the undercut minimizes variations in the pre-loading of the disc by limiting a clamp diameter of a free extending portion of the disc to an outer diameter of the flat annular portion.

* * * * *